C. M. SMITH.
AUXILIARY AUTOMOBILE SEAT.
APPLICATION FILED SEPT. 27, 1917.
1,328,105.
Patented Jan. 13, 1920.
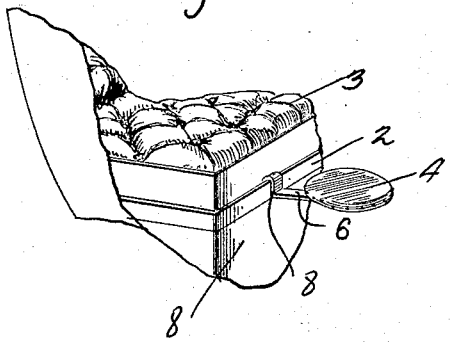
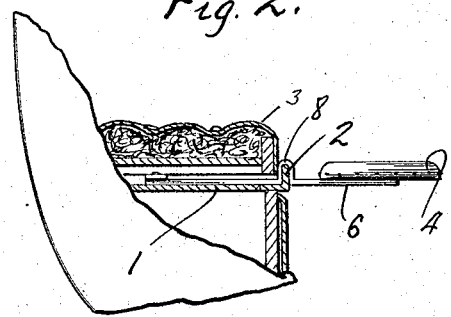
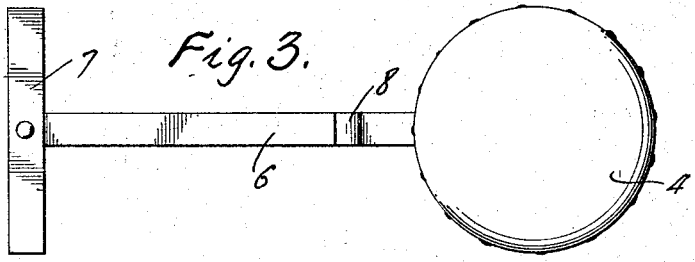
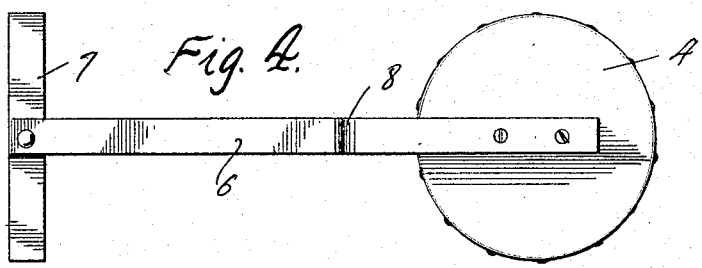
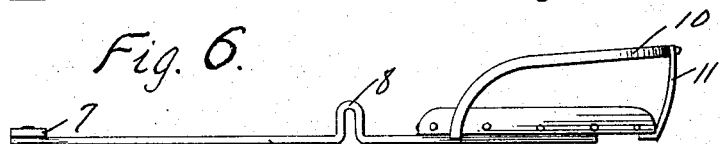
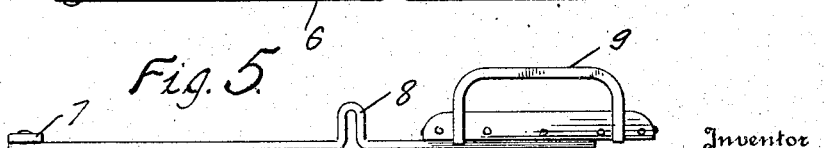
Witnesses
Inventor
C. M. Smith
By
Attorney

UNITED STATES PATENT OFFICE.

CHARLES M. SMITH, OF BELLINGHAM, WASHINGTON.

AUXILIARY AUTOMOBILE-SEAT.

1,328,105. Specification of Letters Patent. Patented Jan. 13, 1920.

Application filed September 27, 1917. Serial No. 193,497.

*To all whom it may concern:*

Be it known that I, CHARLES M. SMITH, a citizen of the United States, residing at Bellingham, in the county of Whatcom, State of Washington, have invented certain new and useful Improvements in Auxiliary Automobile-Seats; and I do hereby declare the following to be a full, clear, and exact description of the invention, such as will enable others skilled in the art to which it appertains to make and use the same.

This invention relates to automobile accessories, and has particular reference to detachable or auxiliary seats for use in automobile bodies, the particular addition being to provide a seat by means of which a child may be supported between the knees of an occupant of the ordinary automobile seat, or between two persons occupying the seat. Furthermore, the seat is mounted upon a bracket which is removably seated below the cushion of an ordinary automobile seat, and is there held by the weight of the occupant or occupants of the seat, so that a properly rigid support is provided for a child, while at the same time, the seat may be removed instantaneously and stored in a safe and out of the way place.

With the above objects in view, and such others relating to the details of construction, as may hereinafter appear, my invention will now be fully set forth and described, reference being had to the accompanying drawings.

In the drawings:—

Figure 1 is a perspective view of the device supported by an automobile cushion, Fig. 2 is a side view with the automobile seat shown, in section, Fig. 3 is a plan view thereof, Fig. 4 is a bottom view, Fig. 5 is a side elevation of a modified form, and Fig. 6 is an elevation of a further modified form.

Referring more particularly to the drawings, 1 represents the usual automobile seat around whose front edge is raised the vertical flange 2 behind which the cushion 3 is held.

The seat 4 is preferably formed of a generally circular base of wood or metal whose upper face is upholstered or cushioned in any suitable manner. Secured to the lower face of the base is a bar 6 which is of such length that the seat 4 may be supported at a suitable distance in front of the cushion 3, while the rear end of the bar is projected between the seat 1 and its cushion. The rear extremity of the bar has riveted or otherwise secured thereto a cross bar which provides the lateral sustaining arms 7 to prevent the seat from overturning to one side or the other, and furthermore the bar 6 is provided with an intermediate upwardly bent loop 8 whose legs are spaced sufficiently apart to permit the reception therebetween of the flange 2.

The use of the seat which has been described is obvious from the foregoing description, but it should be particularly noted that the supporting bracket is instantaneously removed from the seat 1, and that it also utilizes already existent seat structure for the adequate support of the bracket. The weight of the occupant of the seat 4 is supported, practically, by the weight of the party or parties occupying the automobile seat, so that all fastenings or securing devices are done away with. The device is instantaneously set up or removed, and may be stored in a compact space.

In the modified form of Fig. 5, side arms 9 of strap or bar iron may be riveted or hinged to the sides of the seat 4, thereby providing an additional support for the child. In the form shown in Fig. 6, the seat is provided with guards 10 which are formed by extending the side arms forwardly in suitably spaced relation above the seat, and at the front are joined to a standard 11, the spaces on each side of the standard 11 permitting the projection of the child's legs therethrough, and not only providing handholds but a support which will prevent the child from slipping off of the seat. If desired, the side arms 9, or the guards 10 and standard 11 may obviously be removably secured, so that when the seat is to be used by an adult the guards and arms may be quickly dismounted.

What I claim as my invention is:—

The combination with a seat including a horizontal support having an upwardly directed bead at a longitudinal edge, and a cushion upon the support, of a supplemental and removable seat including a flat bar having one end portion disposed between the cushion and support and provided with laterally directed sustaining arms and having its opposite end portion extending beyond the bead of the support and provided with a body receiving seat member, the bar having an upwardly directed bend intermediate of said end portions in which the bead is snugly and removably received, the bar being otherwise in a single plane.

In testimony whereof I affix my signature in the presence of two witnesses.

CHARLES M. SMITH.

Witnesses:
NELLIE TOD,
NELLIE BIDWELL.